(12) United States Patent
Ono et al.

(10) Patent No.: US 8,994,209 B2
(45) Date of Patent: Mar. 31, 2015

(54) ELECTRICAL-POWER-FEED CONNECTOR AND ELECTRICAL POWER SOURCE

(75) Inventors: Tomoya Ono, Toyota (JP); Shigeki Kinomura, Shizuoka-ken (JP); Kensuke Kamichi, Nagakute (JP); Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/561,538

(22) Filed: Jul. 30, 2012

(65) Prior Publication Data

US 2013/0106172 A1 May 2, 2013

(30) Foreign Application Priority Data

Oct. 31, 2011 (JP) .................................. 2011-239367

(51) Int. Cl.
*B60L 1/00* (2006.01)
*B60L 11/18* (2006.01)
*H01M 10/42* (2006.01)

(52) U.S. Cl.
CPC ........ *B60L 11/18* (2013.01); *H01M 2010/4278* (2013.01); *Y02T 10/7005* (2013.01); *Y02T 10/70* (2013.01)
USPC ........................................................ 307/9.1

(58) Field of Classification Search
USPC ........................................................ 307/9.1
See application file for complete search history.

(56) References Cited

U.S. PATENT DOCUMENTS

| | | | |
|---|---|---|---|
| 8,025,526 B1 * | 9/2011 | Tormey et al. | 439/528 |
| 2011/0121779 A1 * | 5/2011 | Ichikawa et al. | 320/109 |

FOREIGN PATENT DOCUMENTS

| | | |
|---|---|---|
| JP | A-2001-008380 | 1/2001 |
| JP | A-2010-035277 | 2/2010 |
| JP | B-5099279 | 12/2012 |
| JP | A-2013-051753 | 3/2013 |
| JP | A-2013-051754 | 3/2013 |
| JP | A-2013-051772 | 3/2013 |
| WO | WO 2013/057775 A1 | 4/2013 |

OTHER PUBLICATIONS

SAE International, Surface Vehicle Recommended Practice, SAE Electric Vehicle and Plug in Hybrid Electric Vehicle Conductive Charge Coupler, J1772, Jan. 2010.
JEVS, Japan Electric Vehicle Association Standards Committee, Electric Vehicle Conductive Charging System General Requirements, Japan Electric Vehicle Association, Mar. 29, 2001.
Sep. 24, 2012 Notification of Reasons for Refusal issued in Japanese Patent Application No. 2011-239367 (with English translation).

* cited by examiner

*Primary Examiner* — Rexford Barnie
*Assistant Examiner* — Dru Parries
(74) *Attorney, Agent, or Firm* — Oliff PLC

(57) ABSTRACT

The present invention relates to: an electrical-power-feed connector connecting an electrical power source and an electrical-power-fed object, the electrical-power-feed connector having a configuration to form a signal path as a closed system, the signal path being to transmit a signal between the electrical-power-feed connector and the electrical power source, the signal having a value to vary depending on: an electrical connection status of the electrical-power-feed connector with the electrical power source, and an instruction to allow feeding of electrical power from the electrical power source to the electrical-power-fed object; and an electrical power source being feedable electrical power to an electrical-power-fed object by being connected with the electrical-power-fed object via the electrical-power-feed connector, the electrical power source having a configuration corresponding to the configuration of the electrical-power-feed connector.

15 Claims, 3 Drawing Sheets

ELECTRICAL-POWER-FEED CONNECTOR AND ELECTRICAL POWER SOURCE

TECHNICAL FIELD

The present invention relates to an electrical-power-feed connector to connect an electrical power source and an electrical-power-fed object that is an object to which an electrical power is fed from the electrical power source, and an electrical power source that can feed electrical power to an electrical-power-fed object by being connected with the electrical-power-fed object through an electrical-power-feed connector.

BACKGROUND ART

Conventionally, electrical power sources that can charge or discharge electrical energy are provided. It is well known that this kind of electrical power source is used for various sorts of purposes. For example, an electrical storage device as an electrical power source (e.g., a secondary battery, a capacitor, and etc.) is applied to a vehicle equipped with a power source (e.g., a motor and etc.) driven by using electrical energy, and the vehicle can run by using driving force generated from the power source. This kind of vehicle includes, for example, an electrical vehicle (EV) and a hybrid vehicle (HV).

Various sorts of methods and configurations are provided for accumulating electrical energy (hereinafter referred to as "charge") to the electrical storage device which is applied to the above-described vehicles (EV, HV). For example, a configuration for this type of charge includes a configuration in which a commercial electrical power source fed to standard house is used as an external electrical power source, and a configuration in which a motor is performed as an electrical generator depending on driving condition of a vehicle (that is, when so-called regeneration brake is performed) and the motor is used as an internal electrical power source.

Further, several methods and configurations are provided for releasing electrical energy (hereinafter referred to as "feed") to a predetermined electrical-power-fed object from an electrical storage device applied to a vehicle, from the viewpoint of protecting environment and alleviating shortage of electrical power in a time of disaster, etc. For example, one of conventional devices for charging-and-discharging electrical power (hereinafter referred to as "conventional device") is applied to an electrical power charging-and-feeding system (so-called HEMS) between a vehicle and a house. In this conventional device, a control signal which varies depending on whether a cable connected to the vehicle is a charging cable or a feeding cable is sent to the vehicle through a predetermined signal line (a signal line for transmitting the CPLT signal defined in the after-described standard), and thereby the vehicle is controlled so as to perform either "charging to the vehicle" or "feeding to the electrical-power-fed object" (see JP 2010-035277 A).

Incidentally, in regard to vehicles that can charge electrical storage device(s) in the vehicles from house units, the "SAE Electric Vehicle Conductive Charge Coupler" is provided as a standard in the USA by the SAE international (November 2001, Society of Automotive Engineers). Further, the "General Requirements for Electrical Vehicle Conductive Charging System" is provided as a standard in Japan (Mar. 29, 2001, Japan Electric Vehicle Standard).

In the standards indicated above, for example, a standard for control pilot is provided. Specifically, the control pilot is defined as a control line that connects: a control circuit of the EVSE (Electric Vehicle Supply Equipment) that feeds electrical power from an internal line to a vehicle; and a grounded part of the vehicle, via a control circuit in the vehicle. And, it is determined based on a signal (so-called CPLT signal) transmitted through this control line (the control pilot) whether or not a charging cable is connected to the vehicle, whether or not charging from an electrical power source to the vehicle is allowed, the rated current of the EVSE, and etc.

SUMMARY OF INVENTION

1. Technical Problem

The conventional device is configured so as to comply with the above standards and transmit information about whether charging or feeding should be performed (in other words, information used for distinction between the charging cable and the feeding cable) to the vehicle as the signal through the signal line (the CPLT signal). However, as indicated above, the signal through the signal line (the CPLT signal) is used for the purpose of transmitting not only the information about whether charging or feeding should be performed, but also the other information (e.g., whether or not the charging cable is connected to the vehicle, whether or not charging from an electrical power source to the vehicle is allowed, the rated current of the EVSE, and etc.).

In the conventional device, the signal to transmit the information about whether charging or feeding should be performed and the signal to transmit the other information are designed so that these signals can be recognized as different signals in the vehicle. Therefore, these signals are not incorrectly recognized as far as the conventional device works normally. However, in the case that the conventional device does not work normally due to various sorts of reasons (e.g., external factors such as aged deterioration of the signal line, contact failure of a connection part of the vehicle and the charging cable or the feeding cable, and etc.), a certain degree of possibility that the signals are incorrectly recognized is not completely denied. In the case that such incorrect recognition occurs, there is the possibility that it is not appropriately determined whether charging or feeding should be performed.

It is desirable to prevent the mis-determination of whether charging or feeding should be performed as far as possible even in a same kind of situation as the above-indicated various sorts of reasons. Further, it is desirable for not only an electrical storage device applied to a vehicle but also any other items that the determination of whether charging to an electrical power source or feeding from an electrical power source is appropriately carried out.

2. Solution to Problem

The present invention has been achieved to solve the above-described problems. Specifically, an object of the invention is to provide an "electrical-power-feed connector" to appropriately carry out the determination of whether charging to an electrical power source or feeding from an electrical power source when the connector is connected to an electrical power source, and an "electrical power source" to appropriately feed electrical power to the electrical-power-fed object via the electrical-power-feed connector.

Firstly, an "electrical-power-feed connector" of the present invention to solve the above-described problems is described below.

An electrical-power-feed connector of the present invention is a connector to connect an electrical power source and an electrical-power-fed object to be fed electrical power from the electrical power source.

The electrical-power-feed connector of the present invention comprises:

a configuration to form a signal path as a closed system, the signal path being to transmit a signal between the electrical-power-feed connector and the electrical power source, the signal having a value to vary depending on (i) an "electrical connection status of the electrical-power-feed connector with the electrical power source" and (ii) an "instruction to allow feeding of electrical power from the electrical power source to the electrical-power-fed object".

The above-described "signal having a value to vary depending on: an electrical connection status of the electrical-power-feed connector with the electrical power source; and an instruction to allow feeding of electrical power from the electrical power source to the electrical-power-fed object" is hereinafter referred to as the "connection signal of the electrical-power-feed connector" for the sake of simplicity.

By the above configuration, when the electrical-power-feed connector is electrically connected to the electrical power source, the electrical-power-feed connector forms the signal path as a closed system (for example, a closed circuit) between the electrical-power-feed connector and the electrical power source. Therefore, other signal(s) due to external situation of the closed system (for example, the CPLT signal described above) is not transmitted on the signal path along with the connection signal of the electrical-power-feed connector. Accordingly, the connection signal of the electrical-power-feed connector and such other signal(s) are prevented from incorrectly recognized.

Further, By the above configuration, when the electrical-power-feed connector is electrically connected to the electrical power source, the transmitted signal(s) via the signal path is not only the signal whose value varies depending on an "electrical connection status of the electrical-power-feed connector with the electrical power source" (in other words, a signal that represents this electrical connection status) but also the signal whose value varies depending on an "instruction to allow feeding of electrical power from the electrical power source to the electrical-power-fed object" (in other words, a signal that represents this instruction). Therefore, when it is determined whether or not a connector connected to the electrical power source is the electrical-power-feed connector (that is, whether or not the electrical power should be fed from the electrical power source), this determination can be carried out based on those two signals. Accordingly, the determination can be carried out more surely compared with the conventional device in which the same determination is carried out based on "only" a signal that represents an electrical connection status of the electrical-power-feed connector with the electrical power source.

Therefore, according to the electrical-power-feed connector of the present invention, it can be appropriately determined whether or not a connector connected to an electrical power source is an electrical-power-feed connector (in other words, either charging to an electrical power source or feeding from an electrical power source should be carried out) when the electrical-power-feed connector is connected to the electrical power source.

By the way, the above "electrical-power-fed object" may be, but not limited to, an object (i.e., an electrical load) to which electrical power is fed from the electrical power source. For example, the followings may be employed as the electrical-power-fed object: general consumer electronics such as a radio and an electrical lamp; specific element(s) on the Home Energy Management System (HEMS) such as a charging-and-discharging stand, an electrical power feeding outlet in home, and etc.; electrical power network(s) that is provided by electrical power company(s); and etc.

Further, the above "feed (or, electrical-power-feed)" represents that electrical energy is fed to the electrical-power-fed object from the electrical power source, but is not limited to a specific embodiment in terms of state of an electrical power source itself (for example, whether or not the electrical power source discharges electrical energy which is accumulated in advance, whether or not the electrical power source feeds electrical energy while the electrical power source generates electrical energy, or etc.). For example, in the case that a vehicle equipped with an electrical power storage is employed as the electrical power storage, examples of the feed include a feeding when an engine of the vehicle does not operate (i.e., discharging) and a feeding when the engine of the vehicle operates (i.e., generating electrical energy).

the above "closed system" represents that a signal due to an external situation of the system (for example, the above-described CPLT signal) is not transmitted on a signal path on which the connection signal of the electrical-power-feed connector is transmitted, but is not limited to a specific configuration. For example, examples of the closed system include a closed circuit that is formed between the electrical-power-feed connector and the electrical power source.

The above "connection status" represents status relating to electrical connection between the electrical-power-feed connector and the electrical power source and includes at least following two statuses: a status where the electrical-power-feed connector and the electrical power source are not electrically connected; and a status where they are electrically connected.

The above "instruction to allow feeding of electrical power from the electrical power source to the electrical-power-fed object" may be, but not be limited to, an instruction that is carried out to allow feeding of electrical power from the electrical power source to the electrical-power-fed object. For example, this instruction may be an instruction that is provided to the electrical-power-feed connector by physical operation(s) by an operator of the electrical-power-feed connector, or an instruction that is electrically provided to the electrical-power-feed connector by other member(s) such as the electrical power source. Further, for example, this instruction may be an instruction that is provided to the electrical-power-feed connector, or an instruction that is provided to the electrical power source.

The above "signal path" may be, but not limited to, a path that can transmit the above-described signal. For example, the followings may be employed as the signal path: a wired signal path such as electrical circuit; a wireless signal path; and etc.

Hereinafter, several specific embodiment of the electrical-power-feed connector of the present invention will be described.

As described above, the electrical-power-feed connector of the present invention is configured to form the "signal path that transmits the connection signal of the electrical-power-feed connector" between the electrical-power-feed connector and the electrical power source. Specifically, as an embodiment, the electrical-power-feed connector may be configured to form the signal path having the following amounts of impedance through the signal path: (i) a first value upon the electrical power source and the electrical-power-feed connector being electrically connected; and (ii) varying value between a second value and a third value depending on the instruction to allow feeding of electrical power from the electrical power source to the electrical-power-fed object, the second value being the same as or different from the first value and the third value being different from the second value.

By the above configuration, in the case that value(s) relating to an impedance through the signal path (hereinafter referred to as "impedance relational value") is employed as the connection signal of the electrical-power-feed connector, a signal path that transfers the impedance relational value is to be formed between the electrical-power-feed connector and the electrical power source.

The above "impedance through the signal path" represents a ratio between voltage and current on the whole path that the signal passes through (in other words, synthetic impedance on the whole path).

The above "first value", the "second value" and the "third value" may be, but not be limited to, values by which the electrical connection status and the instruction to allow feeding of electrical power from the electrical power source to the electrical-power-fed object can be recognized. The first value and the second value may be the same or may be different.

More specifically, as an embodiment, the electrical-power-feed connector of the present invention may be configured to form the signal path having, as the amount of impedance through the signal path, the varying value between the second value and the third value in accordance with a "predetermined variation pattern" depending on the instruction to allow feeding of electrical power from the electrical power source to the electrical-power-fed object.

By the above configuration, in the case that value(s) relating to an impedance through the signal path is employed as the connection signal of the electrical-power-feed connector, the instruction to allow feeding of electrical power from the electrical power source to the electrical-power-fed object can be recognized by the transition of the impedance relational value when the impedance through the signal path varies in accordance with the above-indicated variation pattern.

The above "variation pattern" may be, but not be limited to, a pattern by which the instruction to allow feeding of electrical power from the electrical power source to the electrical-power-fed object can be recognized. For example, the followings may be employed as the variation pattern: a pattern in which the amount of impedance through the signal path alternates between the second value and the third value predetermined number of times (for example, twice) within a predetermined time period; and a pattern in which the amount of impedance through the signal path varies from the second value to the third value, stays at the third value for a predetermined time period, and then backs to the second value.

Next, the "instruction to allow feeding of electrical power from the electrical power source to the electrical-power-fed object" is specifically described. As an embodiment, the electrical-power-feed connector of the present invention may be configured that the instruction to allow feeding of electrical power from the electrical power source to the electrical-power-fed object is carried out with an instruction part equipped on the electrical-power-feed connector.

More specifically, as an embodiment, the electrical-power-feed connector of the present invention may be configured to have:

the instruction part being a member configured to: (i) set the amount of impedance through the signal path to the second value or the third value in a switchable manner; and (ii) vary the amount of impedance through the signal path in accordance with the variation pattern by an operation on the instruction part in accordance with a predetermined pattern.

By the above configuration, the instruction to allow feeding of electrical power from the electrical power source to the electrical-power-fed object is to be transmitted between the electrical-power-feed connector and the electrical power source by the operation on the instruction part.

As above, several specific embodiment of the electrical-power-feed connector of the present invention are described.

On the other hand, the "connection signal of the electrical-power-feed connector" of the present invention may be, but not be limited to, a signal that can be transmitted via the signal path. For example, an "amount of voltage" at a certain position on the signal path may be employed as the connection signal of the electrical-power-feed connector.

Further, the "electrical power source" to which the electrical-power-feed connector is connected may be, but not be limited to, an electrical power source that can feed electrical power to the electrical-power-fed object. For example, a "vehicle" having a chargeable-and-dischargeable electrical storage device may be employed as the electrical power source.

For example, examples of the above "vehicle" include electrically-driven vehicles such as a hybrid vehicle (HV) equipped with an electrical storage device (e.g., secondary battery, capacitor, etc.), a plug-in hybrid vehicle (PHV) and an electrical vehicle (EV). The electrical-power-feed connector of the present invention may be connected to the electrical storage device via the connection part (e.g., an inlet) equipped on the vehicles.

The above "electrical storage device" may be, but not be limited to, a device that can charge and discharge. For example, a secondary battery and a capacitor, etc., may be employed as the electrical storage device.

Further, in the case that a vehicle equipped with the electrical storage device is employed as the electrical power source, a "signal path transmitting information to determine a jointing status of a charging connector and a connection part" that complies with the J1772 standard provided by the SAE may be employed as the signal path.

In regard to the charging systems to charge the electrical storage device equipped on an electrical vehicle such as the plug-in hybrid vehicle (PHV), it has become mainstream to comply with the standard provided by the SAE of the USA. The J1772 standard, which is among various kinds of standards of the SAE, is provided as a standard that relates to various sorts of control signals, cables, connectors, and etc. on a charging system to charge an electrical storage device equipped on vehicles. In the J1772 standard, a signal (cable connection signal) to transmit information to determine a jointing status of a charging connector and a connection part (e.g., an inlet) is defined.

Therefore, the electrical-power-feed connector of the present invention may be easily applied to vehicles complying with the above standard by using a signal path that transmit the above signal complying with the above standard as the signal path to transmit the connection signal of the electrical-power-feed connector of the present invention.

As above, the electrical-power-feed connector of the present invention is described.

Next, the "electrical power source" of the present invention to solve the above problem will be described below. However, the same sort of descriptions as those already described above for the electrical-power-feed connector of the present invention will be omitted for the sake of simplicity.

An electrical power source of the present invention is an electrical power source that can feed electrical power to an electrical-power-fed object by being connected with the electrical-power-fed object through an electrical-power-feed connector.

The electrical power source of the present invention comprises:

a configuration to form a signal path as a closed system, the signal path transmitting a signal between the electrical power source and the electrical-power-feed connector, the signal having a value to vary depending on (i) an electrical connection status of the electrical power source with the electrical-power-feed connector and (ii) an instruction to allow feeding of electrical power from the electrical power source to the electrical-power-fed object.

Further, as an embodiment, the electrical power source of the present invention may be configured to carry out one or both of (i) a determination of the electrical-power-feed connector being electrically connected to the electrical power source and (ii) the feeding of electrical power from the electrical power source to the electrical-power-fed object; upon transmittance of both signals via the signal path, the both signals including: a signal having a value of representing the electrical power source and the electrical-power-feed connector being electrically connected, and a signal having a value of corresponding the instruction to allow feeding of electrical power from the electrical power source to the electrical-power-fed object.

By the above configuration, when the electrical power source and the electrical-power-feed connector are connected, one or both of the "determination of the electrical-power-feed connector being electrically connected to the electrical power source" and the "feeding of electrical power from the electrical power source to the electrical-power-fed object" is carried out based on two signals of the signal whose value varies depending on an "electrical connection status of the electrical-power-feed connector with the electrical power source" (in other words, a signal that represents this connection status) and the signal whose value varies depending on an "instruction to allow feeding of electrical power from the electrical power source to the electrical-power-fed object" (in other words, a signal that represents this instruction).

Therefore, according to the electrical power source of the present invention, it can be appropriately determined whether or not a connector connected to an electrical power source is an electrical-power-feed connector (in other words, either charging to an electrical power source or feeding from an electrical power source should be carried out) when the electrical power source and the electrical-power-feed connector are connected.

Further, as an embodiment, the electrical power source of the present invention may be configured to form the signal path having the following amounts of impedance through the signal path: (i) a first value upon the electrical power source and the electrical-power-feed connector being electrically connected; and (ii) varying value between a second value and a third value depending on the instruction to allow feeding of electrical power from the electrical power source to the electrical-power-fed object, the second value being the same as or different from the first value, and the third value being different from the second value.

More specifically, as an embodiment, the electrical power source of the present invention may be configured to form the signal path having, as the amount of impedance through the signal path, the varying value between the second value and the third value in accordance with a predetermined variation pattern depending on the instruction to allow feeding of electrical power from the electrical power source to the electrical-power-fed object.

Further, an amount of voltage at a certain position on the signal path may be employed as the connection signal of the electrical-power-feed connector of the present invention (i.e., the signal having a value to vary depending on: an electrical connection status of the electrical-power-feed connector with the electrical power source; and an instruction to allow feeding of electrical power from the electrical power source to the electrical-power-fed object). Furthermore, the electrical power source of the present invention may be configured so that a path to provide a reference voltage used for defining the reference of the amount of voltage is connected to a partial path of the signal path belonging to the electrical power source.

Furthermore, in the case that the amount of voltage at a certain position on the signal path is employed as the connection signal of the electrical-power-feed connector, the electrical power source of the present invention may be configured, as an embodiment, to employ the followings:

(i) the amount of voltage at the certain position upon the amount of impedance through the signal path being the first value, as the signal having a value of representing the electrical power source and the electrical-power-feed connector being electrically connected; and (ii) the amount of voltage at the certain position upon the amount of impedance through the signal path varying in accordance with the predetermined variation pattern, as the signal having a value of corresponding the instruction to allow feeding of electrical power from the electrical power source to the electrical-power-fed object.

By the above configuration, the electrical connection status of the electrical power source and the electrical-power-feed connector can be recognized by checking the amount of voltage at the certain position.

As above, several specific embodiment of the electrical power source of the present invention are described.

As described above, the electrical power source of the present invention may be, but not be limited to, an electrical power source that can feed electrical power to the electrical-power-fed object. For example, a "vehicle" having a chargeable-and-dischargeable electrical storage device may be employed as the electrical power source.

Further, in the case that a vehicle equipped with the electrical storage device is employed as the electrical power source, a "signal path transmitting information to determine a jointing status of a charging connector and a connection part" that complies with the J1772 standard provided by the SAE may be employed as the signal path.

As above, the electrical power source of the present invention is described.

DESCRIPTION OF EMBODIMENTS

Figure 1:
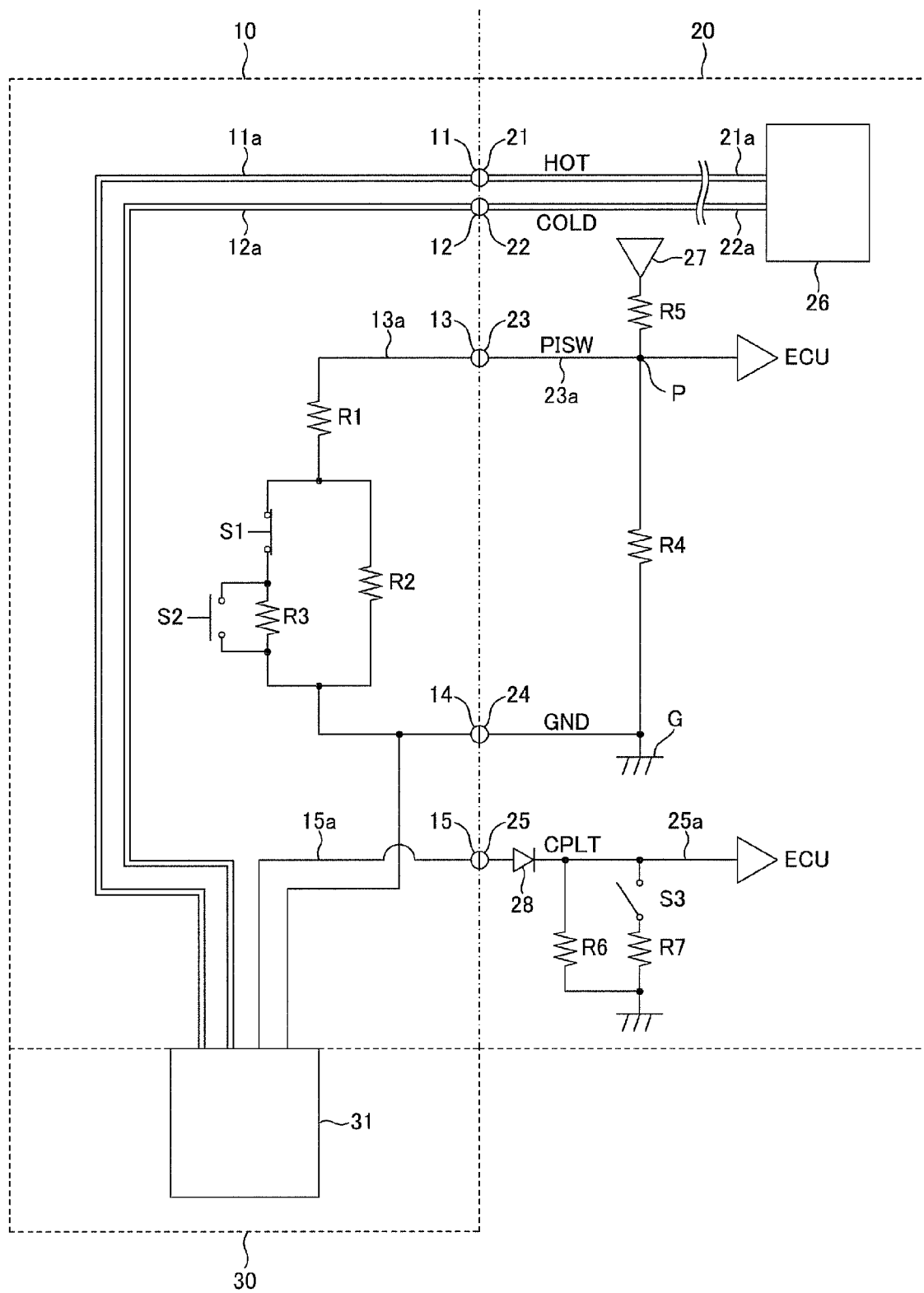
FIG. 1 is a schematic diagram illustrating a concept of a configuration of an electrical-power-feed connector according to an embodiment of the present invention and an electrical power source according to an embodiment of the present invention.

Hereinafter, an embodiment of an electrical-power-feed connector of the present invention and an electrical power source of the present invention will be described by referring to the drawings.

<Outline of Electrical-Power-Feed Connector and Electrical Power Source>

FIG. 1 is a schematic diagram illustrating a concept of a configuration of an electrical-power-feed connector according to an embodiment of the present invention and an electrical power source according to an embodiment of the present invention. An embodiment illustrated in FIG. 1 is such that an electrical-power-feed connector 10 is electrically connected to a vehicle 20 and then the vehicle 20 and a charging-and-feeding stand 31 in a home energy management system (HEMS) 30 as an electrical-power-fed object are connected via the electrical-power-feed connector 10.

The electrical-power-feed connector 10 has ACIH terminal (HOT-side terminal) 11 which corresponds to a signal path to transmit electrical power (electrical power transmission path), ACIC terminal (COLD-side terminal) 12, PISW terminal 13 that corresponds to a "signal path to transmit information to determine a jointing status of a charging connector and a connection part" that is a signal path complying with the J1772 standard provided by the SAE, GND terminal 14 which corresponds to a grounding wire, and CPLT terminal 15 that corresponds to a signal path to transmit the CPLT signal complying with the above-described standard.

An electrical power transmission path 11a whose one end is the ACIH terminal 11 and an electrical power transmission path 12a whose one end is the ACIC terminal 12 run through the electrical-power-feed connector 10 to connect the stand 31. A signal path 13a that has one end of the PISW terminal 13 and the other end of the GND terminal 14 connects these terminals through several resistance units R1, R2, R3 and switches S1, S2 (as will be described later in detail). That is, the signal path 13a connecting the PISW terminal 13 and the GND terminal 14 does not connect to the stand 31. On the other hand, a signal path 15a whose one end is the CPLT terminal 15 is connected to the stand 31 without being connected to the signal path connecting the PISW terminal 13 and the GND terminal 14.

The vehicle 20 has ACIH terminal 21, ACIC terminal 22, PISW terminal 23, GND terminal 24 and CPLT terminal 25 each respectively correspond to the ACIH terminal 11, the ACIC terminal 12, PISW terminal 13, GND terminal 14 and CPLT terminal 15 of the electrical-power-feed connector 10.

An electrical power transmission path 21a whose one end is the ACIH terminal 21 and an electrical power transmission path 22a whose one end is the ACIC terminal 22 are connected to an electrical storage device 26 in the vehicle 20. These electrical power transmission paths may be connected to the electrical storage device 26 through other member(s) such as an inverter. An electrical power transmission path 23a whose one end is the PISW terminal 23 is connected to the GND terminal 24 through the resistance unit R4. Further, a reference voltage 27 is connected to a certain position P of the electrical power transmission path 23a whose one end is the PISW terminal 23 through the resistance unit R5. Furthermore, an ECU of the vehicle 20 is connected to the certain position P. The ECU is configured so as to obtain a voltage value at this certain position P as a "connection signal of the electrical-power-feed connector". On the other hand, an electrical power transmission path 25a whose one end is the CPLT terminal 25 is connected to the ECU through a diode 28. Furthermore, the electrical power transmission path 25a whose one end is the CPLT terminal 25 is grounded through resistance units R6, R7 and switch S3.

As illustrated in FIG. 1, when the electrical-power-feed connector 10 and the vehicle 20 are electrically connected, a closed circuit (that is, a closed system) is formed by: the electrical power transmission path 13a of the electrical-power-feed connector 10, which is the path to connect the PISW terminal 13 and the GND terminal 14; and the electrical power transmission path 23a of the vehicle 20, which is the path to connect the PISW terminal 23 and the GND terminal 24. This closed circuit is hereinafter referred to as the "PISW signal path" for the sake of simplicity.

Next will be described the resistance units and the switches placed on the PISW signal path of the electrical-power-feed connector 10 in detail. The electrical-power-feed connector 10 has: the resistance unit R1 placed on the PISW signal path; the resistance unit R2 and the resistance unit R3 each respectively placed on separated two signal paths that are formed by splitting the PISW signal path into the two signal paths (that is, the resistance unit R2 and the resistance unit R3 are placed in parallel); the switch S1 placed in series on the signal path where the resistance unit R3 is placed; and the switch S2 placed in parallel with respect to the resistance unit R3.

The switch S1 is a switch that opens and closes depending on the electrical connection status of the electrical-power-feed connector 10 and the vehicle 20. Specifically, the switch S1 is configured so as to open and close in conjunction with: a behavior to insert the electrical-power-feed connector 10 into a connection part of the vehicle 20 (an inlet, which is not illustrated in FIG. 1) for the purpose of electrically connecting the electrical-power-feed connector 10 and the vehicle 20; and a behavior to fit a protruded portion (not illustrated) formed on the electrical-power-feed connector 10 into a depressed portion formed on the vehicle 20 for the purpose of fixing the electrical-power-feed connector 10 to the vehicle 20.

More specifically, the switch S1 is configured to "close" when the electrical-power-feed connector 10 is not inserted into the connection part of the vehicle 20 (this status is hereinafter referred to as the "first status"). Further, the switch S1 is configured to "open" when the electrical-power-feed connector 10 is inserted into the connection part of the vehicle 20 to be electrically connected to the vehicle 20 (this status is hereinafter referred to as the "second status"). Furthermore, the switch S1 is configured to "close" again when the protruded portion of the electrical-power-feed connector 10 is fitted into the depressed portion of the vehicle 20 to fix the electrical-power-feed connector 10 to the vehicle 20 (this status is hereinafter referred to as the "third status").

Hereinafter, next will be described by referring to FIG. 1 and FIG. 2 an amount of impedance through the PISW signal path (an amount of the synthetic impedance from the grounded part G to the position P through the PISW signal path) and an amount of voltage Vpisw at the position P when the electrical-power-feed connector 10 and the electrical power source 10 go through the first status, the second status and the third status in this order.

Firstly, in the case that the electrical-power-feed connector 10 and the vehicle 20 are in the first status, the amount of impedance through the PISW signal path corresponds to an amount of impedance of the resistance unit R4 since the PISW terminal 23 and the GND terminal 24 each of the vehicle 20 are opened. The resistance unit R4 is configured so that the amount of voltage V1 at the position P in this case is an amount that belongs to the area VR1 in the voltage distribution map illustrated in FIG. 2.

Further, in the case that the electrical-power-feed connector 10 and the vehicle 20 are in the second status, the amount of impedance through the PISW signal path corresponds to a synthetic impedance of the resistance unit R1, the resistance unit R2 and the resistance unit R4 since the switch S1 opens. The amounts of impedances of the resistance unit R1, the resistance unit R2 and the resistance unit R4 are configured so that the amount of voltage V2 at the position P in this case is an amount that belongs to the area VR2 in the voltage distribution map illustrated in FIG. 2.

Furthermore, in the case that the electrical-power-feed connector 10 and the vehicle 20 are in the third status, the amount of impedance through the PISW signal path corresponds to a synthetic impedance of the resistance unit R1, the resistance unit R2, the resistance unit R3 and the resistance unit R4 since the switch S1 closes. The amounts of impedances of the resistance unit R1, the resistance unit R2, the resistance unit R3 and the resistance unit R4 are configured so that the amount of voltage V3 at the position P in this case is an amount that belongs to the area VR3 in the voltage distribution map illustrated in FIG. 2.

Next, the switch S2 is a switch that opens and closes depending on an instruction to allow a feeding of electrical power from the vehicle 20 to the stand 31. Specifically, the switch S2 is configured to "open" in the third status (in which the electrical-power-feed connector 10 is fixed to the vehicle 20). Further, the switch S2 is configured to "close" when the switch S2 is operated for the purpose of carrying out the instruction (this status is hereinafter referred to as the "fourth status").

In the case that the electrical-power-feed connector 10 and the vehicle 20 are in the fourth status, the amount of impedance through the PISW signal path corresponds to a synthetic impedance of the resistance unit R1 and the resistance unit R4 since the both ends of the resistance unit R2 are short-circuited. The amounts of impedances of the resistance unit R1 and the resistance unit R4 are configured so that the amount of voltage V4 at the position P in this case is an amount that belongs to the area VR4 in the voltage distribution map illustrated in FIG. 2.

As described above, the amounts of impedances of the resistance unit R1, the resistance unit R2, the resistance unit R3 and the resistance unit R4 are configured so that the amounts of impedance through the PISW signal path are different from each other (in other words, so that the amounts of voltage Vpisw at the position P are different each other) depending on the statuses of the first status, the second status, the third status and the fourth status.

By the way, an overview illustrated in FIG. 1 is such that the electrical-power-feed connector 10 and the vehicle 20 in the state that the electrical-power-feed connector 10 is fixed to the vehicle 20 (that is, the third status). Therefore, the switch S1 closes and the switch S2 opens in FIG. 1.

Figure 2:
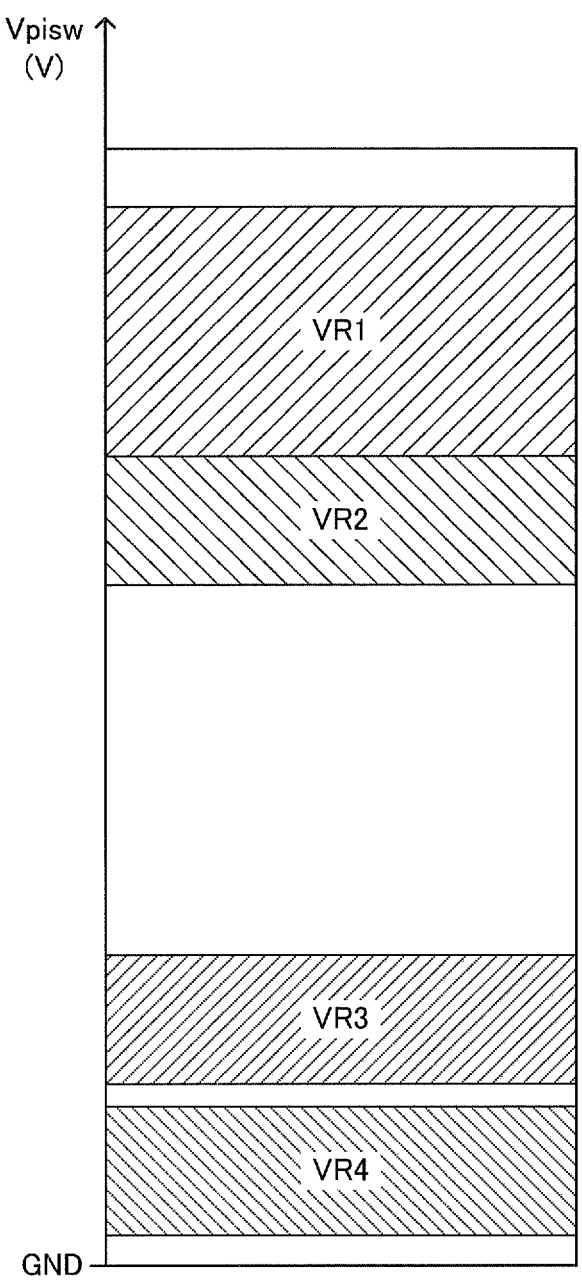
FIG. 2 is a voltage distribution map illustrating a relationship between an amount of voltage Vpisw obtained by the ECU and a connection condition of the electrical-power-feed connector with the electrical power source.

In FIG. 2, areas other than the area VR1, the area VR2, the area VR3 and the area VR4 are not used in the electrical-power-feed connector and the electrical power source of the present invention. These areas are used for other purposes such as carrying out a different determination other than the determinations carried out in the electrical-power-feed connector and the electrical power source of the present invention (for example, a determination whether or not a charging connector is connected to an electrical power source), etc.

<Actual Operation>

The determination "whether or not the electrical-power-feed connector 10 is electrically connected to the vehicle 20" and the determination "whether or not the instruction to allow a feeding of electrical power from the vehicle 20 to the stand 31" are explained below by referring FIG. 3.

Figure 3:
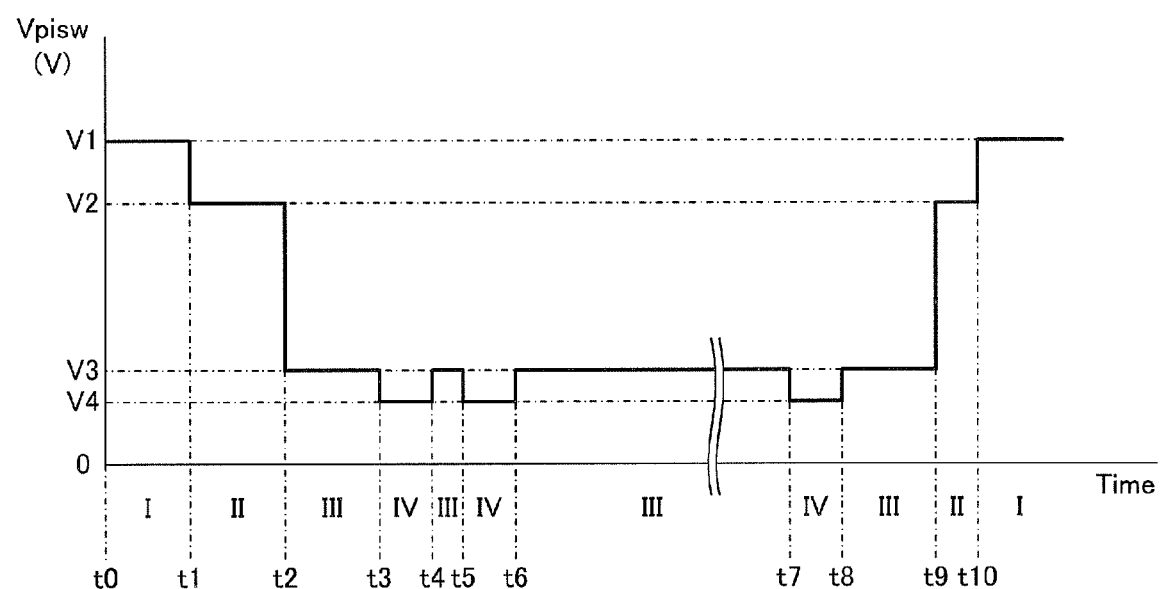
FIG. 3 is a diagram illustrating a relationship between an amount of voltage at a predetermined position on a signal path and passage of time.

FIG. 3 is a time chart illustrating an example of the relationship between an amount of voltage Vpisw at the position P on the PISW signal path and passage of time. In FIG. 3, "I" represents the first status, "II" represents the second status, "III" represents the third status, and "IV" represents the fourth status, respectively.

Firstly, when the time is at the time point t0, the electrical-power-feed connector 10 is not connected to the vehicle 20 (the first status). Therefore, the amount of voltage Vpisw at the position P is the value V1. Further, when the electrical-power-feed connector 10 is inserted into the connection part of the vehicle 20 at the time point t1, the amount of voltage Vpisw at the position P decreases to the value V2. Furthermore, when the electrical-power-feed connector 10 is fixed to the vehicle 20 at the time point t2, the amount of voltage Vpisw at the position P further decreases to the value V3.

The ECU of the vehicle 20 is configured so as to determine that "the electrical-power-feed connector 10 is electrically connected to the vehicle 20" when the amount of voltage Vpisw at the position P is the value V3 (in other words, the amount of voltage Vpisw is a value that belongs to the area VR3 in the voltage distribution map). Therefore, in this embodiment, the ECU determines at the time point t2 that "the electrical-power-feed connector 10 is electrically connected to the vehicle 20".

Secondly, the switch S2 is operated for the purpose of carrying out the instruction to allow a feeding of electrical power from the vehicle 20 to the stand 31 during the time period from the time point t3 to the time point t6. Specifically, an operation of opening and closing the switch S2 is repeated twice in this time period. More specifically, the switch S2 is closed at the time point t3 (the fourth status), thereby the amount of voltage Vpisw at the position P decreases to the value V4. Further, the switch S2 is opened at the time point t4 (the third status), thereby the amount of voltage Vpisw at the position P increases to the value V3. Furthermore, the switch S2 is closed again at the time point t5 (the fourth status), thereby the amount of voltage Vpisw at the position P decreases to the value V4 again. Subsequently, the switch S2 is opened again at the time point t6 (the third status), thereby the amount of voltage Vpisw at the position P increases to the value V3 again.

The ECU of the vehicle 20 is configured so as to determine that "it is instructed to allow the feeding of electrical power from the vehicle 20 to the stand 31" when the amount of voltage Vpisw at the position P varies so as to correspond to the operation that the switch S2 is opened and closed twice within a predetermined time period (e.g., the same time period as that from the time point t3 to the time point t6, or a longer time period than that from the time point t3 to the time point t6). That is, the ECU of the vehicle 20 determines that it is instructed to allow the feeding of electrical power from the vehicle 20 to the stand 31 based on the variation of the amount of voltage Vpisw at the position P (or, variation of the amount of the synthetic impedance) after the electrical-power-feed connector 10 is inserted into the connection part of the vehicle 20 (or, after the connector 10 is inserted thereinto and fixed to the vehicle 20). Therefore, in this embodiment, the ECU determines at the time point t6 that "it is instructed to allow the feeding of electrical power from the vehicle 20 to the stand 31". And then, the feeding of electrical power from the vehicle 20 to the stand 31 is started at the time point t6 or after a predetermined time period has passed from the time point t6.

After that, unless otherwise operated to the switch S2, the ECU continues the feeding of electrical power from the vehicle 20 to the stand 31. Then, the ECU stops the feeding of electrical power from the vehicle 20 to the stand 31 when the switch S2 is opened and closed once from the time point t7 to the time point t8 (that is, when the connection status returns to the third status via the fourth status).

After that, when the time is at time point t9, the fixing of the electrical-power-feed connector 10 to the vehicle 20 is released (the second status). Then, when the time is at time point t10, the electrical-power-feed connector 10 is removed from the connection part of the vehicle 20 (the first status).

As described above, in this embodiment of the electrical-power-feed connector 10 and the vehicle 20, the determination of "whether or not the electrical-power-feed connector 10 is electrically connected to the vehicle 20" and the determination of "whether or not it is instructed to allow a feeding of electrical power from the vehicle 20 to the stand 31" are carried out based on the amount of voltage Vpisw at the position P on the PISW signal path (in other words, the amount of impedance through the PISW signal path) and the variation of the voltage Vpisw.

These are the explanation of an embodiment of the electrical-power-feed connector and the electrical power source of the present invention.

Overview of the Embodiment

As described by referring to FIG. 1 to FIG. 3, the electrical-power-feed connector of the embodiment according to the present invention is an electrical-power-feed connector 10 to connect an electrical power source (the vehicle 20 equipped with the electrical storage device 26) and an electrical-power-fed object (the charging-and-feeding stand 31) to be fed electrical power from the electrical power source 20.

The electrical-power-feed connector 10 comprises a configuration to form a signal path (the PISW signal path) as a closed system (the closed circuit formed by the signal path 13a of the electrical-power-feed connector 10 and the signal path 23a of the vehicle 20), the signal path being to transmit a signal (the connection signal of the electrical-power-feed connector) between the electrical-power-feed connector 10 and the electrical power source 20, the signal having a value to vary depending on: an electrical connection status of the electrical-power-feed connector 10 with the electrical power source 20; and an instruction to allow feeding of electrical power from the electrical power source 20 to the electrical-power-fed object 31.

The electrical-power-feed connector 10 is configured to form the signal path (the PISW signal path) having the following amounts of impedance through the signal path: a first value (which corresponds to the impedance of the resistance unit R4) upon the electrical power source 20 and the electrical-power-feed connector 10 being electrically connected; and varying value between a second value (which corresponds to the synthetic impedance of the resistance unit R1, the resistance unit R2, the resistance unit R3 and the resistance unit R4) and a third value (which corresponds to the synthetic impedance of the resistance unit R1 and the resistance unit R4) depending on the instruction to allow feeding of electrical power from the electrical power source 20 to the electrical-power-fed object 31, the second value being the same as or different from the first value, and the third value being different from the second value.

The electrical-power-feed connector 10 is configured to form the signal path (the PISW signal path) having, as the amount of impedance through the signal path, the varying value between the second value and the third value in accordance with a predetermined variation pattern (thereby the amount of voltage Vpisw at the position P alternates in the time period from the time point t3 to the time point t6 as illustrated in FIG. 3) depending on the instruction (the operation of opening and closing the switch S2) to allow feeding of electrical power from the electrical power source 20 to the electrical-power-fed object 31.

Regarding the electrical-power-feed connector 10, the instruction to allow feeding of electrical power from the electrical power source 20 to the electrical-power-fed object 31 is carried out with an instruction part (the switch S2) equipped on the electrical-power-feed connector 10.

Regarding the electrical-power-feed connector 10, the instruction part S2 is a member configured to: set the amount of impedance through the signal path (the PISW signal path) to the second value or the third value in a switchable manner (see FIG. 2); and vary the amount of impedance through the signal path (the PISW signal path) in accordance with the variation pattern by an operation on the instruction part S2 in accordance with a predetermined pattern (that is, opening and closing the switch S2 twice in the time period from the time point t3 to the time point t6 in FIG. 3).

Regarding the electrical-power-feed connector 10, an amount of voltage Vpisw at a certain position P on the signal path (the PISW signal path) is employed as the signal (the connection signal of the electrical-power-feed connector).

Regarding the electrical-power-feed connector 10, the electrical power source 20 is a vehicle 20 having a chargeable-and-dischargeable electrical storage device 26.

Regarding the electrical-power-feed connector 10, the signal path (the PISW signal path; the signal path 13a and 23a in FIG. 1) is a "signal path transmitting information to determine a jointing status of a charging connector and a connection part" that complies with the J1772 standard provided by the SAE.

Further, as described by referring to FIG. 1 to FIG. 3, the electrical power source of the embodiment according to the present invention is an electrical power source (the vehicle 20) being feedable electrical power to an electrical-power-fed object 31 by being connected with the electrical-power-fed object 31 through an electrical-power-feed connector 10.

The electrical power source 20 comprises a configuration to form a signal path (the PISW signal path) as a closed system, the signal path transmitting a signal between the electrical power source 20 and the electrical-power-feed connector 10, the signal having a value to vary depending on: an electrical connection status of the electrical power source 20 with the electrical-power-feed connector 10; and an instruction to allow feeding of electrical power from the electrical power source 20 to the electrical-power-fed object 31.

The electrical power source 20 carries out one or both of: a determination of the electrical-power-feed connector 10 being electrically connected to the electrical power source 20; and the feeding of electrical power from the electrical power source 20 to the electrical-power-fed object 31, upon transmittance of both signals via the signal path (the PISW signal path), the both signals including: a signal having a value of representing the electrical power source 20 and the electrical-power-feed connector 10 being electrically connected (the amount of voltage Vpisw at the position P of the value V3); and a signal having a value of corresponding the instruction to allow feeding of electrical power from the electrical power source 20 to the electrical-power-fed object 31 (the amount of voltage Vpisw at the position P of alternating as illustrated from the time point t3 to the time point t6 in FIG. 3).

The electrical power source 20 is configured to form the signal path (the PISW signal path) having the following amounts of impedance through the signal path: a first value (see above) upon the electrical power source 20 and the electrical-power-feed connector 10 being electrically connected; and varying value between a second value (see above) and a third value (see above) depending on the instruction to allow feeding of electrical power from the electrical power source 20 to the electrical-power-fed object 31, the second value being the same as or different from the first value, and the third value being different from the second value.

The electrical power source 20 is configured to form the signal path (the PISW signal path) having, as the amount of impedance through the signal path, the varying value between the second value and the third value in accordance with a predetermined variation pattern (see above) depending on the instruction to allow feeding of electrical power from the electrical power source 20 to the electrical-power-fed object 31.

Regarding the electrical power source 20, an amount of voltage Vpisw at a certain position P on the signal path (the PISW signal path) is employed as the signal (the connection signal of the electrical-power-feed connector). Further, the electrical power source 20 is configured so that a path to provide a reference voltage 27 for defining the reference of the amount of voltage being connected to a partial path (the position P in FIG. 1) of the signal path (the PISW signal path) belonging to the electrical power source 20.

Regarding the electrical power source 20, the electrical power source 20 is configured to employ the followings: the amount of voltage Vpisw at the certain position P upon the amount of impedance through the signal path (the PISW signal path) being the first value, as the signal having a value of representing the electrical power source 20 and the electrical-power-feed connector 10 being electrically connected; and the amount of voltage Vpisw at the certain position P upon the amount of impedance through the signal path (the PISW signal path) varying in accordance with the predetermined variation pattern, as the signal having a value of corresponding the instruction to allow feeding of electrical power from the electrical power source 20 to the electrical-power-fed object 31.

Regarding the electrical power source 20, the electrical power source 20 is a vehicle 20 having a chargeable-and-dischargeable electrical storage device 26.

Regarding the electrical power source 20, the signal path (the PISW signal path) is a "signal path transmitting information to determine a jointing status of a charging connector and a connection part" which complies with the J1772 standard provided by the SAE.

While the invention has been described in detail by referring to the specific embodiments, it is apparent that various modifications or corrections may be made by the person skilled in the art without departing from the spirit and the scope of the invention.

For example, the vehicle 20 equipped with the electrical power storage 26 is employed as the electrical power source in the above embodiment. However, the electrical power source of the present invention is not limited to the vehicle 20 but may be an electrical power source that can feed electrical power to an electrical-power-fed object via the electrical-power-feed connector.

Further, in the above embodiment, the employed pattern as the variation pattern of the impedance through the signal path (the variation pattern of the amount of voltage Vpisw at the position P) is that the amount of impedance through the signal path goes up and down twice between the second value and the third value within a predetermined time period. However, the variation pattern of the impedance through the signal path is not limited to this pattern but may be a pattern by which the instruction to allow the feeding of electrical power from an electrical power source to an electrical-power-fed object can be recognized.

The invention claimed is:

1. An electrical-power-feed connector to connect a vehicle having a chargeable-and-dischargeable electrical storage device and an electrical-power-fed object to be fed electrical power from the vehicle, the electrical-power-feed connector comprising:
a configuration to form a signal path as a closed system, the signal path being configured to transmit a signal between the electrical-power-feed connector and the vehicle, the signal having a value to vary depending on:
a state of a first switch in the closed signal path in the electrical-power-feed-connector, the state of the first switch varying based on an electrical connection status of the electrical-power-feed connector with a connection part of the vehicle; and
a state of a second switch in the closed signal path in the electrical-power-feed-connector, the state of the second switch varying based on an instruction to allow feeding of electrical power from the vehicle to the electrical-power-fed object,
the electrical-power-feed connector using, as the signal path, a signal path complying with the J1772 standard provided by the SAE and transmitting information to determine a jointing status of a charging connector and the connection part.

2. The electrical-power-feed connector according to claim 1,
wherein the electrical-power-feed connector is configured to form the signal path having the following amounts of impedance through the signal path formed between the electrical-power-feed connector and the vehicle:
a first value upon the connection part of the vehicle and the electrical-power-feed connector being electrically connected; and
a varying value between a second value and a third value depending on the instruction to allow feeding of electrical power from the vehicle to the electrical-power-fed object, the second value being the same as or different from the first value, and the third value being different from the second value.

3. The electrical-power-feed connector according to claim 2,
wherein the electrical-power-feed connector is configured to form the signal path having, as the amount of impedance through the signal path formed between the electrical-power-feed connector and the vehicle, the varying value between the second value and the third value in accordance with a predetermined variation pattern depending on the instruction to allow feeding of electrical power from the vehicle to the electrical-power-fed object.

4. The electrical-power-feed connector according to claim 3,
wherein the instruction to allow feeding of electrical power from the vehicle to the electrical-power-fed object is carried out with an instruction part equipped on the electrical-power-feed connector.

5. The electrical-power-feed connector according to claim 4,
wherein the instruction part is a member configured to:
set the amount of impedance through the signal path formed between the electrical-power-feed connector and the vehicle to the second value or the third value in a switchable manner; and vary the amount of impedance through the signal path in accordance with the variation pattern by an operation on the instruction part in accordance with a predetermined pattern.

6. The electrical-power-feed connector according to claim 1,
wherein an amount of voltage at a certain position on the signal path is employed as the signal transmitted through the signal path formed between the electrical-power-feed connector and the vehicle.

7. A vehicle having a chargeable-and-dischargeable electrical storage device, the vehicle being configured to feed electrical power from the vehicle to an electrical-power-fed object by being connected with the electrical-power-fed object via an electrical-power-feed connector, the vehicle comprising:
a configuration to form a signal path as a closed system, the signal path transmitting a signal between the vehicle and the electrical-power-feed connector, the signal having a value to vary depending on:
a state of a first switch in the closed signal path in the electrical-power-feed-connector, the state of the first switch varying based on an electrical connection status of a connection part of the vehicle with the electrical-power-feed connector; and
a state of a second switch in the closed signal path in the electrical-power-feed-connector, the state of the first switch varying based on an instruction to allow feeding of electrical power from the vehicle to the electrical-power-fed object,
the vehicle using, as the signal path, a signal path complying with the J1772 standard provided by the SAE and transmitting information to determine a jointing status of a charging connector and the connection part.

8. The vehicle according to claim 7, wherein
the vehicle carries out a determination of the electrical-power-feed connector being electrically connected to the connection part of the vehicle upon transmittance of a signal having a value of representing the connection part of the vehicle and the electrical-power-feed connector being electrically connected, the signal being transmitted through the signal path formed between the vehicle and the electrical-power-feed connector,
the vehicle feeds electrical power from the vehicle to the electrical-power-fed object upon transmittance of a signal having a value of corresponding the instruction to allow feeding of electrical power from the vehicle to the electrical-power-fed object, in the case of the vehicle carrying out the determination of the electrical-power-feed connector being electrically connected to the connection part of the vehicle.

9. The vehicle according to claim 7,
wherein the vehicle is configured to form the signal path having the following amounts of impedance through the signal path formed between the vehicle and the electrical-power-feed connector:
a first value upon the connection part of the vehicle and the electrical-power-feed connector being electrically connected; and
a varying value between a second value and a third value depending on the instruction to allow feeding of electrical power from the vehicle to the electrical-power-fed object, the second value being the same as or different from the first value, and the third value being different from the second value.

10. The vehicle according to claim 9,
wherein the vehicle is configured to form the signal path having, as the amount of impedance through the signal path formed between the vehicle and the electrical-power-feed connector, the varying value between the second value and the third value in accordance with a predetermined variation pattern depending on the instruction to allow feeding of electrical power from the vehicle to the electrical-power-fed object.

11. The vehicle according claim 10,
wherein an amount of voltage at a certain position on the signal path being employed as the signal transmitted through the signal path formed between the vehicle and the electrical-power-feed connector.

12. The vehicle according to claim 11,
wherein a path to provide a reference voltage used for defining the reference of the amount of voltage is connected to a partial path belonging to the vehicle of the total signal path formed between the vehicle and the electrical-power-feed connector.

13. The vehicle according to claim 11,
wherein the vehicle is configured to employ the following:
the amount of voltage at the certain position upon the amount of impedance through the signal path being the first value, as the signal having a value of representing the connection part of the vehicle and the electrical-power-feed connector being electrically connected, the signal path being formed between the vehicle and the electrical-power-feed connector; and
the amount of voltage at the certain position upon the amount of impedance through the signal path varying in accordance with the predetermined variation pattern, as the signal having a value of corresponding the instruction to allow feeding of electrical power from the vehicle to the electrical-power-fed object.

14. The electrical-power-feed connector according to claim 1,
wherein the signal path is for proximity detection according to the J1772 standard;
the first switch is configured to close when the electrical-power-feed-connector is not inserted into a connection part of the vehicle and is configured to open when the electrical-power-feed connector is inserted into the connection part of the vehicle; and
the first switch operates according to the J1772 standard for proximity detection.

15. The vehicle according to claim 7,
wherein the signal path is for proximity detection according to the J1772 standard;
the first switch is configured to close when the electrical-power-feed-connector is not inserted into a connection part of the vehicle and is configured to open when the electrical-power-feed connector is inserted into the connection part of the vehicle; and
the first switch operates according to the J1772 standard for proximity detection.

* * * * *